Jan. 24, 1967  M. HUIZINGA  3,299,522
GYROSCOPIC INSTRUMENT
Filed Oct. 8, 1964  2 Sheets-Sheet 1
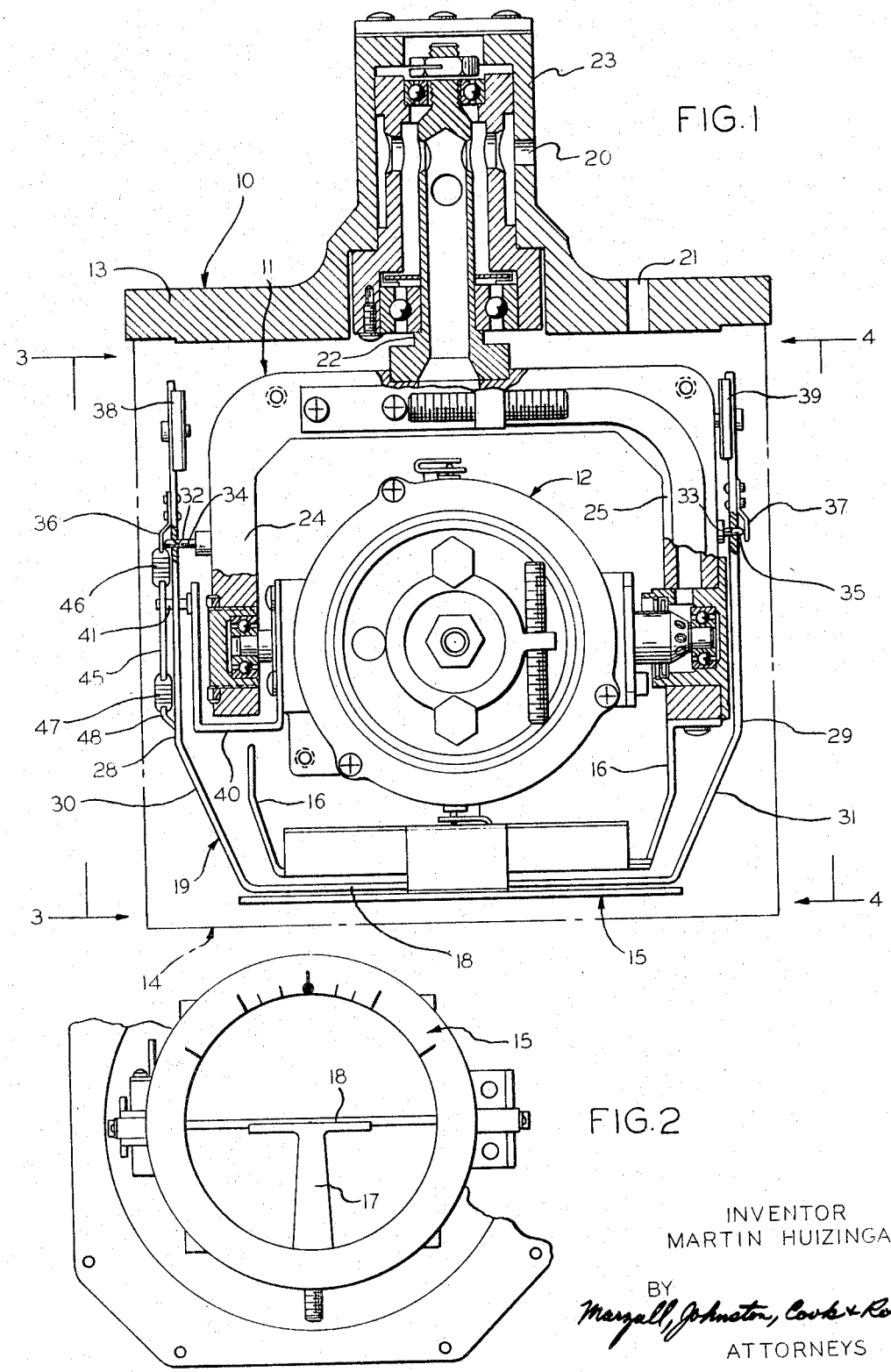
INVENTOR
MARTIN HUIZINGA
BY
Marzall, Johnston, Cook & Root
ATTORNEYS

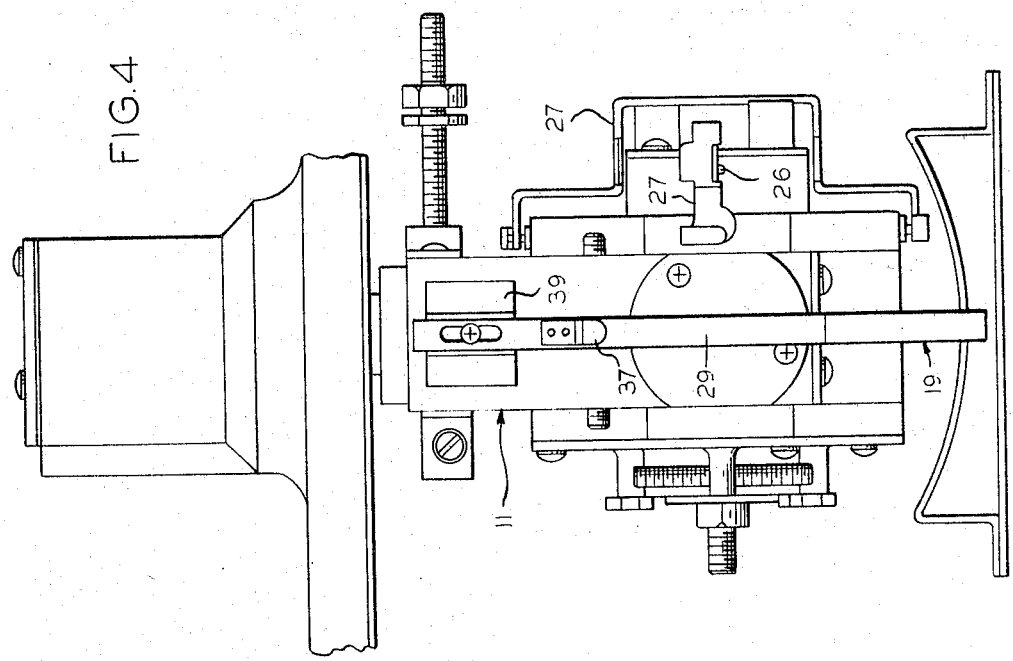
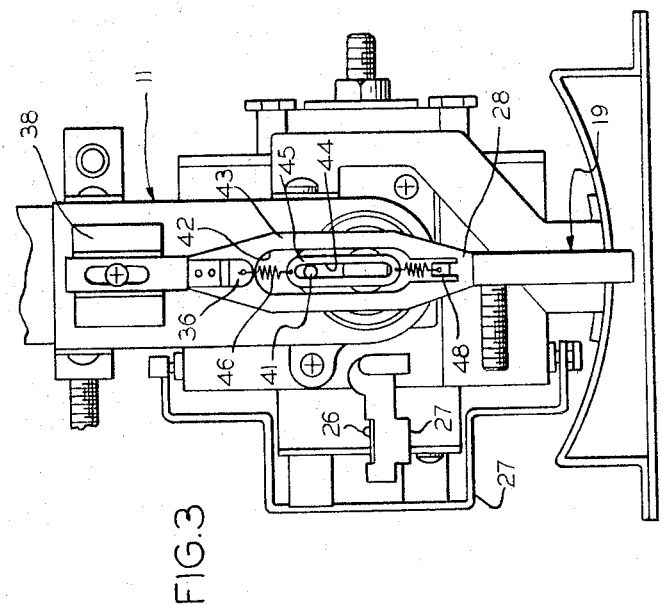

United States Patent Office 3,299,522
Patented Jan. 24, 1967

3,299,522
GYROSCOPIC INSTRUMENT
Martin Huizinga, Wyoming, Mich., assignor to R. C. Allen Business Machines, Inc., Grand Rapids, Mich., a corporation of Michigan
Filed Oct. 8, 1964, Ser. No. 402,465
2 Claims. (Cl. 33—204)

This invention relates in general to aircraft instruments, and more particularly to aircraft instruments for determining the attitude of aircraft while in flight, and still more particularly to gyroscopic instruments for use in aircraft that are capable of giving accurate readings.

In gyroscopic instruments for aircraft, indicating needles or bars are usually provided for coaction with a dial for reading the instrument, and these indicating bars or needles are usually coupled to the rotor housing and responsive to relative movement between the rotor housing and the frame and/or gimbal of the instrument. Heretofore, vibration was frequently the cause of incorrect readings wherein vibration inputs to the instrument are normally transmitted through the rotor housing to the indicating bar or needle. It is apparent that incorrect readings may lead to improper maneuvering of the aircraft and inaccurate navigation.

Therefore it is an object of this invention to provide an improved gyroscopic instrument capable of providing accurate readings.

Another object of this invention resides in the provision of a gyroscopic instrument for use in determining attitude of an aircraft and employing an indicating bar or needle that is provided with means for coupling it to the rotor housing wherein more accurate reading of the instrument can be accomplished.

A further object of this invention is to provide an aircraft gyroscopic instrument including a rotor housing having a rotor therein pivotally mounted in a gimbal and a horizon bar pivotally carried on the gimbal and coupled to the rotor housing with a compliable member to eliminate the transmission of vibration inputs between the rotor housing and the horizon bar.

Other objects, features and advantages of the invention will be apparent from the following detailed disclosure, taken in conjunction with the accompanying sheets of drawings, wherein like reference numerals refer to like parts, in which:

FIG. 1 is a top plan view of a gyroscopic instrument constructed in accordance with the invention, showing some parts broken away and other in section for purposes of clarity;

FIG. 2 is a fragmentary front elevational view of the instrument of FIG. 1;

FIG. 3 is a side elevational view of the instrument of FIG. 1 and taken generally along line 3—3 thereof; and FIG. 4 is a side elevational view of the instrument of FIG. 1 and taken substantially along line 4—4 thereof.

The gyroscopic instrument of the present invention is illustrated in an embodiment wherein the gyro has two degrees of freedom, and the particular embodiment illustrated is referred to in the industry as a horizon gyro or roll and pitch indicator. This instrument is capable of indicating the attitude of the aircraft within which it is installed, and particularly the amount of roll and pitch involved in maneuvers. The invention particularly relates to means for substantially eliminating vibrations that are usually visually discernible in an indicating needle or bar and in the embodiment in the horizon bar. It should be appreciated that the invention is of such scope as to be applicable to any gyroscopic instrument where it is desired to substantially eliminate the transmission of vibration inputs to the instrument to the indicating bar or needle. Further, while the illustrated embodiment relates to a pneumatic gyro, the present invention could be applied to a gyro driven by any desirable means. It should also be appreciated that the invention could likewise be employed in a gyro having one degree of freedom, although it is not believed necessary to illustrate such a gyro in this application.

Referring now to the drawings, and particularly to FIG. 1, the embodiment illustrated includes a frame 10 having a gimbal fork 11 pivotally mounted thereto, and in turn, pivotally carrying a rotor housing 12. The frame 10 defines a rear wall 13 for the instrument, and a casing 14 (indicated in dot-dash lines) coacts with the rear wall 13 to enclose the gyro in an airtight housing.

A dial 15 is suitably supported by brackets 16 to the gimbal fork 11 and marked with indicia to indicate the roll condition of the aircraft. A suitable horizon guide or indicating element 17 coacts with the dial 15 and an indicating portion 18 of a horizon bar 19 to denote the pitch condition of the aircraft. The horizon bar 19 responds to the position of the rotor housing 12 in a manner more clearly explained hereinafter.

As already mentioned, the embodiment illustrated is a pneumatic gyro and which may be driven by compressed air or a vacuum. An air inlet 20 and an air outlet 21 may be appropriately connected with a suitable air supply for powering the gyro. If compressed air is employed, the supply would be connected to the air inlet 20, and air within the casing 14 would exhaust through the air outlet 21. If the gyro were to be powered by a vacuum, a vacuum line would be connected to the air outlet 21, and the air inlet 20 would serve as a means for permitting air to be taken into the casing 14. The manner in which the air would be fed to the rotor housing 12 is of no importance to the present invention, although it may be said that the air passes inwardly through a stub shaft 22, a part of the gimbal fork 11, and on into the rotor housing to drive the rotor (not shown).

The gimbal fork 11 is secured to and cantileverly mounted on the stub shaft 22 which is bearingly mounted in the hub 23 of the frame 10. The rotor housing 12 is bearingly mounted between the arms 24 and 25 of the gimbal fork 11 along a horizontal axis that is perpendicular to the horizontal axis of the stub shaft 22. In this embodiment, the horizontal axis of the stub shaft 22 constitutes the roll axis of the gyro, while the horizontal axis of the rotor housing 12 constitutes the pitch axis of the gyro.

After the air within the rotor housing is spent, having acted on the rotor, it is exhausted through a plurality of air exhaust and erection ports 26 (only two shown in FIGS. 3 and 4) which coact with erection vanes 27 for maintaining the spin axis of the rotor erect.

Referring now to FIGS. 1, 3 and 4, the horizon bar 19 includes parallel opposed arms 28 and 29 that are interconnected with the indicating portion 18 by inclined segments 30 and 31, respectively. Thus the horizon bar 19 is substantially U-shaped and the indicating portion 18 extends substantially perpendicular to the arms 28 and 29. The arms 28 and 29 are provided with openings 32 and 33 that bearingly receive pintles 34 and 35 extending outwardly from the gimbal arms 24 and 25. The pintles are coaxially aligned, and leaf springs 36 and 37 are secured to the horizon bar arms 28 and 29, respectively, for engaging the outer free ends of the pintles and holding the horizon bar against lateral movement along the pintles. Counterbalancing weights 38 and 39 are carried on the free ends of the arms 28 and 29, respectively, for counterbalancing the portion of the horizon bar on the opposite sides of the pintles 34 and 35.

In order to couple the rotor housing 12 to the horizon bar 19, a U-shaped bracket 40 is secured at one end to one side of the rotor housing 12 and provided at the other end with a drive pin 41 that extends parallel to the pivotal axis of the horizon bar 19 and the pivotal axis of the rotor housing 12. Moreover, the drive pin 41 is offset from the pivotal axis of the horizon bar and the rotor housing. The drive pin 41 extends through an enlarged slot 42 formed in an enlarged portion 43 of the horizon bar arm 28. The drive pin 41 further extends into slidable engagement with a slot 44 formed in a guide member 45 that is suspended between a pair of coil springs 46 and 47. The coil spring 46 is secured at one end to one end of the guide member 45 and at the other end to the leaf spring 36, while the spring 47 is connected at one end to the other end of the guide member and at the other end to a lug 48 struck from the arm 28. As noted in FIG. 1, the guide member 45 is displaced from the plane of the arm 28 away from the gimbal fork 11, and as seen in FIG. 3, the slot 44 in the guide member 45 extends coaxially with the axis of the slot 42 and the arm 28. Thus the guide member 45 is compliably held by the horizon bar 19 thereby compliably connecting the rotor housing 12 to the horizon bar 19. It should be appreciated that compliable means other than the springs 46 and 47 may be employed to compliably mount the guide member 45 with respect to the horizon bar 19. And the compliant members 46 and 47 between the body of the horizon bar 19 and the drive pin slot 44 effectively provide an anti-resonance device in the arm of the horizon bar which for all practical purposes eliminates visually discernible vibrations. Thus the vibration inputs to the instrument which are transmitted through the rotor housing are absorbed by the compliant members 46 and 47 and therefore not transmitted to the horizon bar 19, thereby reducing if not eliminating vibration errors of the horizon bar.

It will be understood that modifications and variations may be effected without departing from the scope of the novel concepts of the present invention, but it is understood that this application is to be limited only by the scope of the appended claims.

The invention is hereby claimed as follows:

1. In a gyroscopic instrument for use in determining the attitude of aircraft in flight including a frame adapted to be in fixed relationship to the aircraft, a gimbal pivotally mounted on the frame, a rotor housing pivotally carried by said gimbal, a rotor rotatably mounted in the rotor housing, a substantially U-shaped horizon bar having a pair of substantially parallel arms pivotally carried on said gimbal and extending to one side thereof and an indicating portion extending between the ends of said arms at the one side of said gimbal, and means for coupling said rotor housing to said horizon bar so that said bar is responsive to relative movement between said gimbal and said rotor housing, said means comprising a bracket extending from said rotor housing and having a drive pin mounted thereon and extending parallel to the pivotal axis of the horizon bar, a guide member having a slot therein normally extending parallel to one of the gimbal arms and slidably receiving said drive pin, and a plurality of springs resiliently mounting said guide member to one of said arms.

2. In a gyroscopic instrument for use in determining the attitude of aircraft in flight including a frame adapted to be in fixed relationship to the aircraft, a gimbal pivotally mounted on the frame, a rotor housing pivotally carried by said gimbal, a rotor rotatably mounted in the rotor housing, a substantially U-shaped indication bar having a pair of substantially parallel arms pivotally carried on said gimbal and extending to one side thereof and an indicating portion extending between the ends of said arms at the one side of said gimbal, and means for coupling said rotor housing to said indication bar so that said bar is responsive to relative movement between said gimbal and said rotor housing, said means comprising a bracket extending from said rotor housing and having a drive pin mounted thereon and extending parallel to the pivotal axis of the indication bar, a guide member receiving said drive pin, and means resiliently supporting said guide member on one of said arms.

References Cited by the Examiner

UNITED STATES PATENTS

| | | | |
|---|---|---|---|
| 2,207,414 | 7/1940 | Rodanet | 33—204.2 |
| 2,444,625 | 7/1948 | Bevins | 33—204.1 |
| 2,450,875 | 10/1948 | Braddon et al. | 33—204.2 |
| 2,524,745 | 10/1950 | Adkins | 33—204.2 |
| 2,734,278 | 2/1956 | Hammond | 33—204.2 |

LEONARD FORMAN, *Primary Examiner.*

WILLIAM D. MARTIN, JR., *Assistant Examiner.*